United States Patent [19]
Moisan et al.

[11] Patent Number: 4,944,244
[45] Date of Patent: Jul. 31, 1990

[54] APPARATUS FOR THE PRODUCTION OF PREFORMS FOR OPTICAL FIBERS

[75] Inventors: Monique Moisan; Dominique Pavy, both of Lannion; Marie-Eve Davoust, Michel S/Orge; Serge Saada, Kremlin-Bicetre; Patrick Chollet, Les Ulis, all of France

[73] Assignee: Etat Francais Represente Par Le Ministere Des Postes, Issy Les Moulineaux, France

[21] Appl. No.: 323,623

[22] Filed: Mar. 14, 1989

[30] Foreign Application Priority Data

Mar. 16, 1988 [FR] France ................................ 88 03392

[51] Int. Cl.$^5$ ............................................. C23C 16/50
[52] U.S. Cl. ..................................... 118/723; 65/3.12; 65/3.2; 118/665; 118/688; 118/712; 118/725; 427/45.1; 427/163
[58] Field of Search ................... 65/3.12, 3.2; 118/665, 118/688, 712, 723, 725, 708; 427/163, 45.1, 166

[56] References Cited

FOREIGN PATENT DOCUMENTS 3222189 1/1984 Fed. Rep. of Germany .
2575151 6/1986 France .

OTHER PUBLICATIONS

Chollet, P. and S. Saada, "Model and Rate Constant Determination for SPCVD Fiber Preform Fabrication", Optical Fiber Communication Conference and Sixth International Conference on Integrated Optics and Optical Fiber Communication Technical Digest, Reno, Nev. (Jan. 19-22, 1987) p. 105.
Pavy, D. et al., "Fabrication of Optical Fiber Preforms by a New Surface-Plasma CVD Process", 12th European Conference on Optical Communication Technical Digest, vol. 1, Palacio de Congresos, Barcelona, Spain (Sep. 22-25, 1986) pp. 19-22.

Primary Examiner—Richard Bueker
Assistant Examiner—Terry J. Owens
Attorney, Agent, or Firm—Pearne, Gordon, McCoy & Granger

[57] ABSTRACT

It realizes the chemical vapor phase deposition method using a plasma maintained by surface waves in a tube (2) for obtaining a preform and comprises photodetection means (50) sensitive to the light emitted by the deposition area (54) of the vitreous coating resulting from the reaction between appropriate gaseous compounds and able to supply information relative to the emission area of said light, and means (52) for controlling the displacement of the deposition area, displacement being such that the thickness of the coating is uniform in the tube, and control means controlling the power of the microwave generator (30) of the apparatus as a function of the information. Application to the field of telecommunications.

15 Claims, 5 Drawing Sheets

APPARATUS FOR THE PRODUCTION OF PREFORMS FOR OPTICAL FIBERS

BACKGROUND OF THE INVENTION

The present invention relates to an apparatus for the production of preforms for optical fibers. It more particularly applies to the field of telecommunications, where optical fibers are being increasingly used.

The following documents:
(1) FR-A-2 575 151
(2) FR-A-2 600 327
(3) The article by D. PAVY et al entitled "Fabrication of optical fiber preforms by a new surface-plasma CVD process" published in the ECOC '86 Conference Proceedings, Barcelona, Spain, 1986, pp 19 to 22, to which reference can be made, describes an apparatus for the production of preforms for optical fibers utilizing chemical vapour phase deposition with a plasma maintained by travelling surface waves. This apparatus makes it possible to deposit on the inner surface of a glass tube, e.g. of silica, a vitreous coating intended for the subsequent formation of the core of optical fibers and leads to correct deposits with respect to the efficiency and chemical purity. However, the deposits obtained can have thickness homogeneity defects.

SUMMARY OF THE INVENTION

The object of the present invention is to obviate this disadvantage by proposing an improved apparatus making it possible to improve the thickness homogeneity. To this end, the apparatus according to the invention comprises electronic regulation or control means cooperating with photodetection means for obtaining a uniform coating thickness of the tube.

More specifically, the present invention relates to an apparatus for the production of preforms for optical fibers comprising means for depositing on the inner surface of a glass tube a vitreous coating serving for the subsequent formation of the core of the optical fibers, said means comprising:

means for continuously passing from a first end of the tube to the second end of the tube, a mixture of ionizable gaseous compounds able to bring about the formation of the coating by reacting with one another, an ultra-high frequency coupler located on the side of the second end of the tube and provided for forming in said tube a plasma column for activating the reaction, said ultra-high frequency coupler being able to inject a travelling surface wave into the plasma column, and a variable power microwave generator for supplying the ultra-high frequency coupler with an electromagnetic power and for continuously and progressively varying said power, in such a way that the end of the plasma column sweeps the tube, the vitreous coating deposit taking place at a given time in a deposition zone emitting a light characteristic of the reaction and which is located in the plasma column in the vicinity of the end thereof, characterized in that the apparatus also comprises:

photodetection means sensitive to said light and able to supply information relative to the position of the deposition zone, and electronic means for controlling the displacement of the deposition zone, said displacement being such that the thickness of the coating is uniform, control means being provided for controlling the power of the generator as a function of information supplied by the photodetection means.

Thus, the apparatus according to the invention has control means utilizing optical information with a view to obtaining a longitudinal thickness homogeneity of the elementary films of the vitreous coating successively deposited on the inner face of the glass tube.

Admittedly document (4) DE-A-3222189 discloses a chemical vapour phase deposition process using a plasma for internally coating a tube made from a dielectric material. The tube to be internally coated is integrated into a metal tube coaxial to the end of which is located a coaxial system for modulating a surface wave making it possible to maintain a plasma column. Complicated regulating or control means having a microwave interferometer are also provided so that the plasma column head moves at a constant speed along the tube to be internally coated.

However, the present invention uses a simpler control, because it uses optical means and not interferometric means.

The present invention more particularly applies to the production of preforms according to the process described in document (2), which requires a very thick silica tube on the inner face of which is deposited a vitreous coating.

Preferably, the photodetection means are fixed with respect to the ultra-high frequency coupler, serve to observe the successive positions of the deposition zone when the end of the plasma column sweeps the tube and are able to supply electrical signals taking account of the successive positions.

In this case, the photodetection means can comprise a photosensitive linear sensor arranged parallel to the tube axis and having optical filtering means for only permitting the passage of light characterizing the reaction.

The apparatus according to the invention also comprises a furnace or oven for raising the tube to a temperature at least approximately equal to 1000° C., said furnace preferably having a longitudinal slit making it possible to observe the displacement of the deposition zone from the end of the furnace, said slit extending parallel to the tube axis, whilst the photosensitive linear sensor is provided with optics placed outside the furnace facing the slit and at an appropriate distance therefrom in order to locate the different successive positions.

The photosensitive linear sensor can comprise a single photosensitive element of the position sensor type, where only a small area of said element is excited at once by the characteristic light of the reaction. Such sensors are commercially available and directly supply an analog voltage proportional to the position of the excited area of the photosensitive element.

As a variant, the photosensitive linear sensor can comprise a plurality of photosensitive elements, only one group of adjacent photosensitive elements being excited at once by the characteristic light.

Such photodetection means comprising a plurality of photosensitive elements can make it possible, as will be shown hereinafter, to obtain information on the width of the deposition area at a given time and consequently are able to regulate the width of said deposition area if the need arises.

In the case of a linear displacement (i.e. at constant speed) imposed on the deposition area, maintaining a constant value of the width of said deposition area makes it possible to further improve the thickness homogeneity of the deposited vitreous coating.

In a special embodiment of the apparatus according to the invention, the photosensitive linear sensor having a plurality of photosensitive elements is a charge coupled sensor in the form of an array or strip.

Moreover, when the photosensitive linear sensor comprises said plurality of photosensitive elements, the regulating or control means can comprise means for filtering signals supplied by the photodetection means, determination means for locating on the basis of said filtered signals, a photosensitive end element for each successively excited group and processing means able to impose on the microwave generator, on the basis of the thus located or marked photosensitive end elements, a control voltage, whose time evolution brings about the displacement of the deposition area bringing about the uniform coating thickness.

The determination means can comprise means for converting the light signal corresponding to the characteristic light into a rectangular pulse, whose time width of the high level is proportional to the full width at half maximum of said light signal and counting means for determining said photosensitive end element on the basis of the rectangular pulse.

These determination means can also be provided for supplying an information making it possible to determine the width of the deposition area at a given time.

The determination means can also comprise other counting means for determining the number of photosensitive elements of the excited group, on the basis of the time width of the high level of the rectangular pulse.

This control or regulation can be a closed loop control, the information supplied by the photodetection means being processed and compared on a permanent basis in electronic control means with position information initially stored in said electronic control means.

Conversely, said regulation or control can be an open loop control, the information supplied by the photodetection means being used at least initially by electronic control means for determining a series of appropriate control voltages of the microwave generator.

It is also possible to carry out an open loop control for which the information supplied by the photodetection means are used by the electronic control means for periodically refreshing a series of control voltages of the microwave generator stored in the electronic control means.

Finally, the electronic control means can permit a displacement at constant speed of the deposition area.

BRIEF DESCRIPTION OF THE DRAWINGS

The present invention is described in greater detail hereinafter relative to non-limitative embodiments and with reference to the attached drawings, wherein show.

DETAILED DESCRIPTION OF THE PREFERRED EMBODIMENTS

Figure 1:
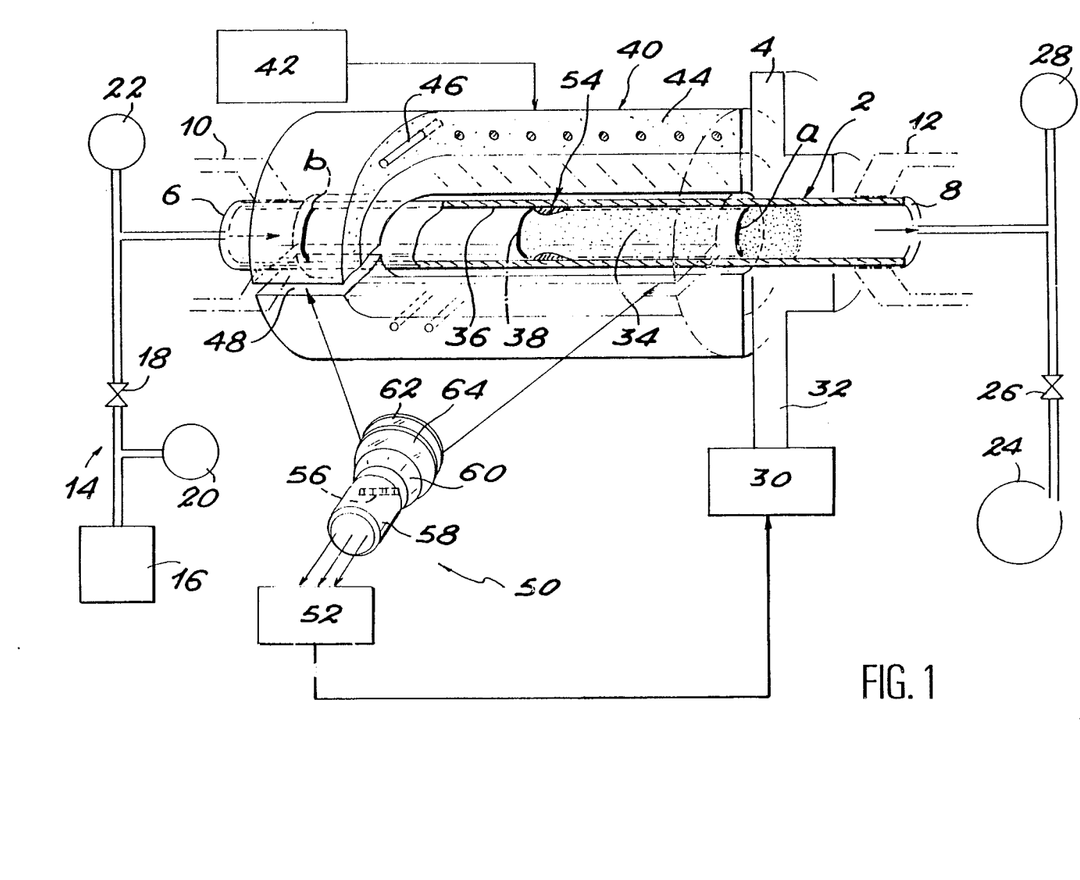
FIG. 1 A diagrammatic view of an embodiment of the apparatus according to the invention.

The apparatus diagrammatically shown in FIG. 1 is intended for the deposition of an appropriate vitreous coating on the inner face of a glass tube 2, e.g. of silica, with a view to obtaining a preform on the basis of which will be formed the optical tubes, whose core will result from said vitreous coating.

The apparatus serves to bring out a chemical vapour phase deposition activated by a plasma produced and maintained by a travelling surface wave and to this end has an ultra-high frequency coupler 4, e.g. of the SUR-FAGUIDE type.

The ends 6 and 8 of the tube 2 are respectively held by tubular end fittings or terminations 10 and 12. The ultra-high frequency coupler 4 is located between these two end fittings, on the side of the one carrying the reference numeral 12 in the embodiment shown in FIG. 1 and thus surrounds the tube 2 close to one of its ends. The point at which the coupler 4 is located is advantageously outside the useful deposition area of the vitreous coating. Moreover, the coupler 4 is fixed with respect to the end fittings 10 and 12. It does not move parallel to the axis of the tube 2 during the deposition of the vitreous coating within said tube 2.

The apparatus shown in FIG. 1 also comprises a means 14 for injecting through the end fitting 10 furthest from the coupler 4 an appropriate gaseous mixture, e.g. constituted by oxygen and silicon tetrachloride vapour, if it is wished to obtain a pure silica coating, or the above mixture to which is added a dopant in the form of fluorine or a derivative of the latter, if it is wished to obtain a fluorine-doped silica coating. A germanium oxide doping would require the addition to the mixture in question of traces of $GeCl_4$.

The injection means 14 comprise means 16 able to supply the appropriate gaseous mixture under a given pressure and supply same to the end 6 of the tube 2 via a flow regulating valve 18. Gauges 20 and 22 provide information on the pressure between the means 16 and the valve 18, on the one hand, and between the latter and the end 6 of the tube 2 on the other.

The apparatus shown in FIG. 1 also comprises means 24 for pumping the gaseous mixture to the other end 8 of the tube 2 through the end fitting 12 and via a suction regulating valve 26 of the pumping means 24 (the latter e.g. incorporating a pump such as that known under the name ROOTS pump). A gauge 28 is also provided to give information on the pressure between end 8 of the tube 2 and valve 26.

The apparatus shown in FIG. 1 also comprises a variable power microwave generator 30 for supplying the coupler 4 via a waveguide 32. The generator 30 can be externally controlled by an analog voltage varying between 0 and 5 V and, in a purely indicative and non-limitative manner, can be obtained from the company SAIREM.

When the gaseous mixture circulates within the tube 2, a plasma column 34 is formed within said tube as a result of the travelling surface wave produced by the coupler 4. The vitreous coating 36 is obtained by modifying the power of the generator 30, which causes an alternating variation of the length of the column 34 and therefore an alternating displacement of the end or front 38 of said column between two areas of the interior of the tube 2 and which are designated by a and b in FIG. 1 and which define said useful deposition area. The distance between areas a and b corresponds to the length on which it is wished to deposit the vitreous coating.

The internal deposition of doped or undoped silica takes place level with the front of the plasma column, in such a way that during one outward and return travel of said front in the tube two elementary vitreous films are deposited within the tube, all the said elementary films constituting the vitreous coating 36. This internal deposition of doped or undoped silica takes place with an excellent efficiency of approximately 100% for $SiO_2$ and 80% for $GeO_2$.

It is necessary to raise the interior of the tube 2 where the vitreous coating deposition takes place to a temperature of at least approximately 1000° C. and, for example, between 1000° and 1200° C. To this end, the apparatus shown in FIG. 1 comprises an oven or furnace 40 for heating at least the useful area of the tube 2, the ends 6 and 8 of the latter passing outside the furnace, the latter thus extending between the coupler 4 and the end fitting 10. Means 42 are provided for controlling the furnace 40, in such a way that the latter is at the desired temperature.

The furnace 40 comprises an envelope 44 and, within the latter, two rows of heating elements 46 extending along the furnace and positioned in such a way that when the tube is within the furnace, it is located between said rows of heating elements. The latter are in the form of regularly spaced bars, which are perpendicular to the furnace axis.

The envelope 44 of said furnace is longitudinally slotted, a slit 48 being produced on the envelope 44 parallel to the furnace axis, which makes it possible to observe the furnace interior.

Figure 5A:
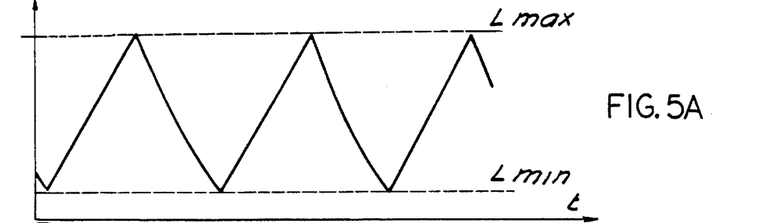
FIGS. 5A and 5B Diagrammatically the linear sweeping or scanning of the tube by the end of a plasma column formed within the same by means of an apparatus shown in FIG. 1, as well as the time variations of the power supplied by the microwave generator forming part of said apparatus and making it possible to obtain said linear sweep or scan.

In the embodiment shown in FIG. 1, an alternating displacement of the front of the plasma column 34 at a programmed speed, e.g. at a constant speed, has been sought between areas a and b. The plasma column length L is consequently a periodic function of the sawtooth time t, which varies between a minimum value Lmin and a maximum value Lmax (cf. FIG. 5A).

Figure 5B:
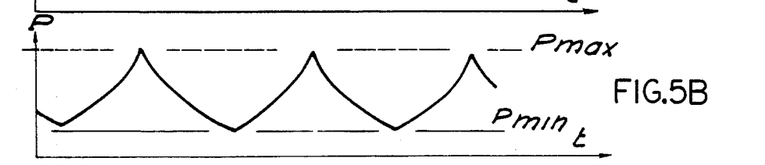

As will be shown hereinafter, the microwave generator 30 is appropriately controlled so as to supply a power P varying with the same period as the length L as a function of the time t, between a minimum value Pmin and a maximum value Pmax corresponding respectively to Lmin and Lmax (cf. FIG. 5B).

In order to obtain the programmed speed displacement, e.g. a constant speed, of the front of plasma column 34, the apparatus shown in FIG. 1 comprises an optical sensor 50 placed outside furnace 40 and which serves to observe at least the useful area of the tube 2 when the latter is placed inside the furnace. The apparatus shown in FIG. 1 also comprises electronic control means 52 for controlling the generator 30 as a function of signals supplied by the optical sensor 30, with a view to obtaining the displacement of the front of plasma column 34 at a programmed, e.g. constant, speed along the axis of tube 2.

Figure 2:
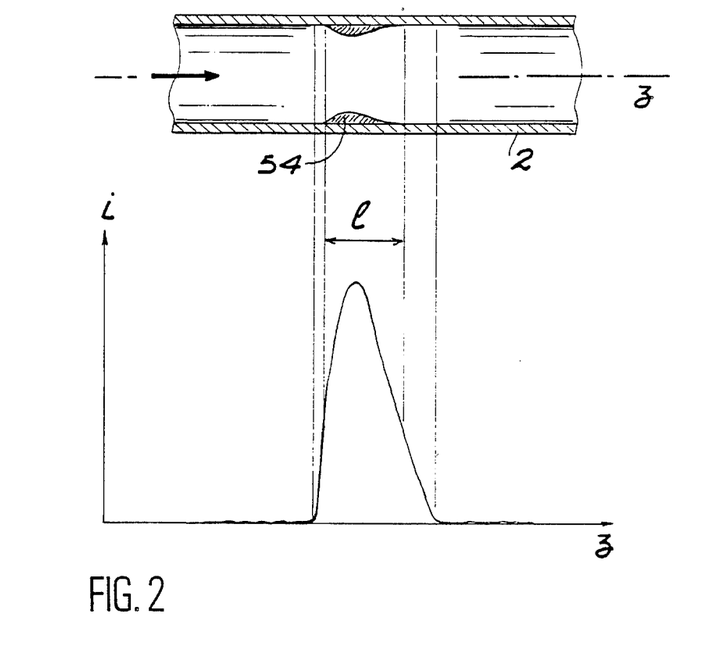
FIG. 2 Diagrammatically, at a given time, the deposition area of the vitreous coating on the inner face of a glass tube treated in the apparatus shown in FIG. 1, as well as the characteristic light emitted by said deposition area.

FIG. 2 diagrammatically shows a longitudinal sectional view of the tube 2 along axis z thereof. The gaseous mixture flowing in the tube interacts with the plasma column in order to generate activated species, such as Si or SiO, permitting the formation of the vitreous coating. The deposition area 54, seen in longitudinal section in FIG. 2, is located at the front of the plasma column and therefore carries out reciprocating movements in tube 2. The activated species in said deposition area emit a radiation characteristic of the reaction leading to the deposit, said radiation being in the range between the blue and the near ultraviolet.

It should be noted that the size of the deposition area 54, in both FIGS. 2 and 1, has been exaggerated in order to make said area 54 more clearly visible.

FIG. 2 also shows the variations of the intensity i of the characteristic radiation, as a function of the position on the tube axis z. The intensity i is substantially zero throughout, except in the region corresponding to the deposition area, where said intensity i assumes the form of a peak, which effectively reproduces, to within a homothetic transformation, the shape of the profile of the deposition area seen in section. The full width at half maximum 1 of said peak is a very good approximation of the real width of the deposition area 54 (to within a homothetic transformation).

In the embodiment shown in FIG. 1, the optical sensor 50 has a plurality of photosensitive elements. It comprises a charge coupled device 56 in the form of an array or strip and which is referred to hereinafter as CCD array, as well as a control system or card 58 for said array 56. The array is fixed and placed facing the slit 48, parallel to the tube axis (which is itself parallel to the axis of furnace 40) and at an appropriate distance from said slit to make it possible to observe the useful area of the tube through an appropriate optics 60, which is e.g. constituted by a camera lens.

Moreover, two filters 62, 64 are located in front of the lens 60, respectively for stopping the infrared radiation of the furnace and for stopping the visible rays of wavelengths below those of blue radiation, so that only the characteristic radiation reaches the CCD array.

Figure 3:
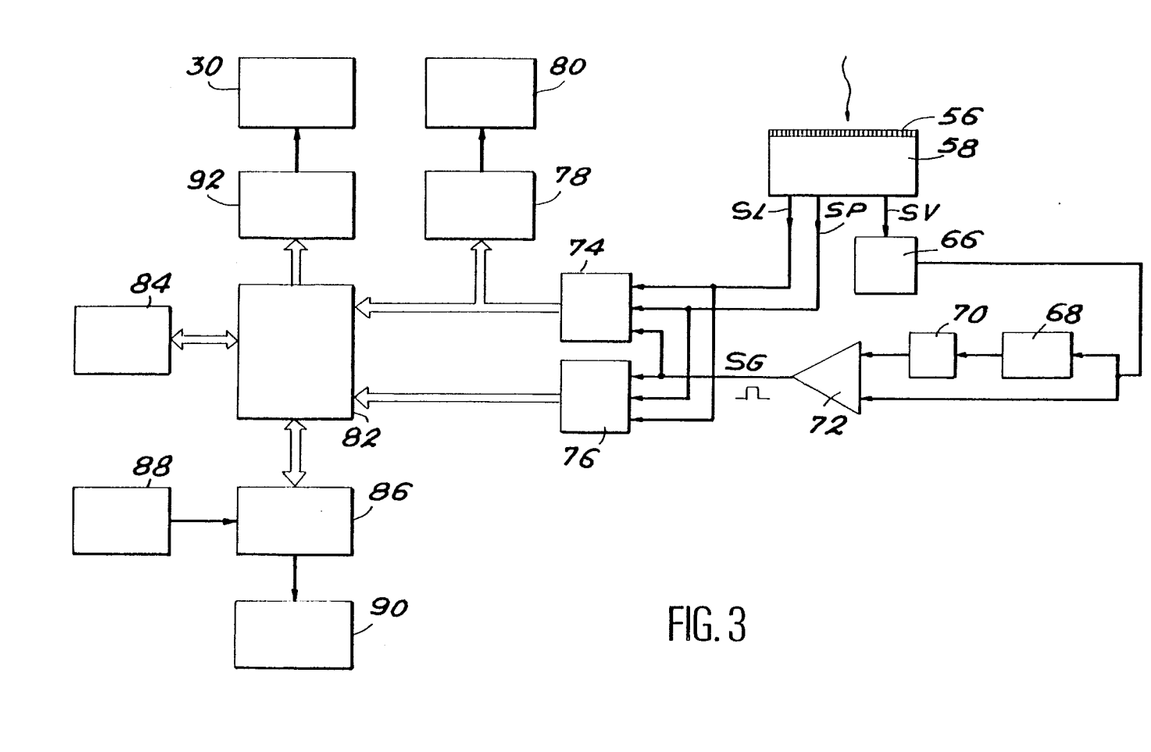
FIG. 3 A diagrammatic view of electronic control means of the apparatus of FIG. 1.

FIG. 3 diagrammatically shows the electronic control means 52 used with the CCD array 56. In these control means 52, the video signal SV supplied by the card 58 associated with the array 56 firstly undergoes an analog filtering by means of a low-pass filter 66, whose cut-off frequency is, for example, approximately 500 kHz, in order to eliminate from the video signal the "noise" due to the resulting sampling of the CCD array.

The thus filtered video signal is supplied to the input of the means 68 for detecting the maximum amplitude of said video signal and whose output is connected to the input of divider means 70 able to supply at the output a threshold signal, whose amplitude is equal to half the maximum amplitude of the video signal.

The card 58 supplies in electrical form a succession of images resulting from the electronic scanning of the CCD array. The total of said images constitutes the video signal. The maximum amplitude of the video signal in practice does not vary between the individual images. In addition, the relative threshold signal at each image is supplied to a first input of a comparator 72, whose other input receives the video signal relative to the following image. The latter is compared with the threshold signal in question in the comparator 72, which supplies at the output a TTL signal in the form of a rectangular pulse SG (FIG. 4) for said image.

Figure 4:
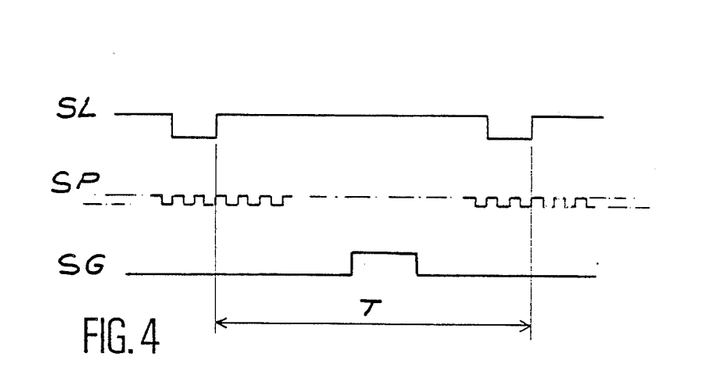
FIG. 4 A chronogram of certain signals used in the electronic control means.

The card 58 associated with the CCD array also supplies a line synchronization SL signal TTL (FIG. 4) and a point synchronization SP signal TTL (FIG. 4). This point sync signal is in strobe form and passes to logic state 1 whenever a photodetector or "point" of the CCD array is read. The line sync signal is a periodic signal of period T, which is at logic state 1 throughout the image reading time.

The electronic control means shown in FIG. 3 also comprise a first counter 74 and a second counter 76, both of which receive at the input the signals SL, SP and SG. The first counter 74 counts the number of logic states 1 of the point sync signal (number of transitions 0 to 1 or number of transitions 1 to 0 of said signal) from the time when the line sync signal passes to logic state 1 to the time when the signal from the comparator passes from logic state 0 to logic state 1. The reading of the first counter 74 consequently supplies the photosensitive element or photodetector number of the CCD array at which the deposition area starts at the considered instant. The second counter 76 counts the number of logic states 1 of the point sync signal between the time when the first counter 74 stops counting and the time when the signal from the comparator again passes to logic state 0. Thus, the reading of the second counter supplies the full width at half maximum of the deposition area.

In a purely indicative and non-limitative manner, the reading of the CCD array takes place from right to left in FIG. 1, in such a way that the first counter makes it possible to locate the plasma column front.

In the electronic control means shown in FIG. 3, the position information concerning the plasma column front (giving the position of the deposition area) and the width information with respect to said deposition area are updated at each image supplied by the CCD array by means of the card 58.

The information given by the first counter 74 or position counter controls a digital-analog converter 78, so that an analog signal is available giving the position of the plasma column front. The converter 78 is connected to display means, such as an oscilloscope 80, so as to be able to visually check said position of the plasma column front.

The electronic control means shown in FIG. 3 also comprises a microprocessor 82, which reads the counters 74 and 76 and which is associated with storage means 84 (RAM and ROM), as well as a microcomputer 86 equipped with data input means 88 (e.g. a keyboard) and output means 90, e.g. a video monitor, making it possible to display the various informations.

The microprocessor uses the informations which it reads on the counter 74 in order to produce in digital form a control voltage of microwave generator 30. This digital voltage is converted into an analog voltage signal by a digital-analog converter 92, whose output controls the generator 30.

The microcomputer 86 makes it possible to supply the microprocessor 82 (or more precisely place in the memory 84 associated therewith) various control parameters of the apparatus according to FIG. 1, e.g. the positions designated by letters a and b in FIG. 1.

The microprocessor 82 is controlled by a program comprising interpretation instructions of the commands issued by the microcomputer, performance instructions for these commands and control instructions of the microprocessor peripherals, as well as a subprogram or subroutine constituting a closed loop control algorithm making it possible to produce the microwave generator control voltage.

This control algorithm uses a method such as the LAGRANGE method or the method of proportional parts in order to find the zero of a function. According to this method, the abscissa for which the function is cancelled out is the limit of a sequence of abscissas, each term of the sequence corresponding to the intersection of the axis of the abscissas with the tangent to the graph of the function at the point having for its abscissa the preceding term of the sequence.

In the apparatus shown in FIG. 1, control can be either in closed or open loop form.

With regard to the closed loop control, in the memory associated with the microprocessor is formed a table of positions respectively associated with the various positions of the front of the plasma column in the tube, said table being defined by a minimum position Xmin and a maximum position Xmax and by the total number of positions in the table, said positions being spaced by a constant amount with respect to one another. The microprocessor is also supplied with the frequency at which said table must be traversed. For closed loop control, the microprocessor passes through the position table at the desired frequency, from Xmin to Xmax and then from Xmax to Xmin and then again from Xmin to Xmax and so on, which corresponds to the sweeping of the tube by the plasma column and for each of these successive positions X, the microprocessor calculates by means of the algorithm, the control voltage of the generator making it effectively possible to arrive at said position X. More specifically, the microprocessor produces a control voltage giving a certain position XR for the plasma column front. This position is determined on the basis of the CCD array and the microprocessor compares this real position XR with the desired position X and increases or decreases the control voltage if XR is below or above X and so on until coincidence (with an imposed precision) occurs between X and XR.

With regard to the open loop control, in the memory of the microprocessor is also formed the aforementioned position table, as well as a voltage table having a sequence of voltages respectively associated with the positions of the position table. The voltage table is formed prior to the effective use of the apparatus shown in FIG. 1 with, in said apparatus, a tube solely serving for the control thereof. For each position X of the position table, the microprocessor also seeks the voltage to be applied to the microwave generator to obtain said position X, by successive approximations by means of the closed loop control program, as has been explained hereinbefore.

When the two tables are obtained, the effective use of the apparatus shown in FIG. 1 can commence. With a tube being ready for treatment in the apparatus, the microprocessor passes through the voltage table at the desired frequency from the minimum voltage Vmin to the maximum voltage Vmax, then from Vmax to Vmin, then again from Vmin to Vmax and so on.

Oscilloscope 80 makes it possible to check whether the displacement of the plasma column front is indeed linear. It is necessary to observe a displacement, whose time evolution is of the type shown in FIG. 5A.

If the values XR of the real positions are different from the values X of the desired positions, due to a drift in time of one or other of the parameters governing the operation of the apparatus, deposition is interrupted and the voltage table is re-formed for the same position values which are fixed in the position table.

The calculation algorithm is such that it minimizes the number of iterations making it possible to obtain the good control voltage, said number of iterations being equal to or below 4.

Open loop control is more advantageous than closed loop control for speed reasons. Thus, a scanning or sweeping frequency of the tube 2 of approximately 10 Hz is possible with an open loop control, whereas with closed loop control said frequency can hardly exceed 1 Hz. However, it should be noted that the possible scan frequencies are dependent on the number of points of the position table and therefore the precision desired by users for the thickness of the tube coating. In a purely indicative and non-limitative manner, for a 50 cm long internal coating, the position table can have 150 values.

In preferred manner, it is possible to obtain an apparatus controlled by a microprocessor, which makes a periodic acquisition of the curve of the real positions of the plasma column front as a function of time (these positions being visible on oscilloscope 80 as in FIG. 1) and which refreshes the control voltage table if this is necessary, e.g. if the variation between the real positions and the desired positions at the same time exceeds 5%. For starting the coating operation, the initial voltage table can be chosen in an arbitrary manner, bearing in mind that it must be compatible with the length of the tube to be internally coated.

Figure 6:
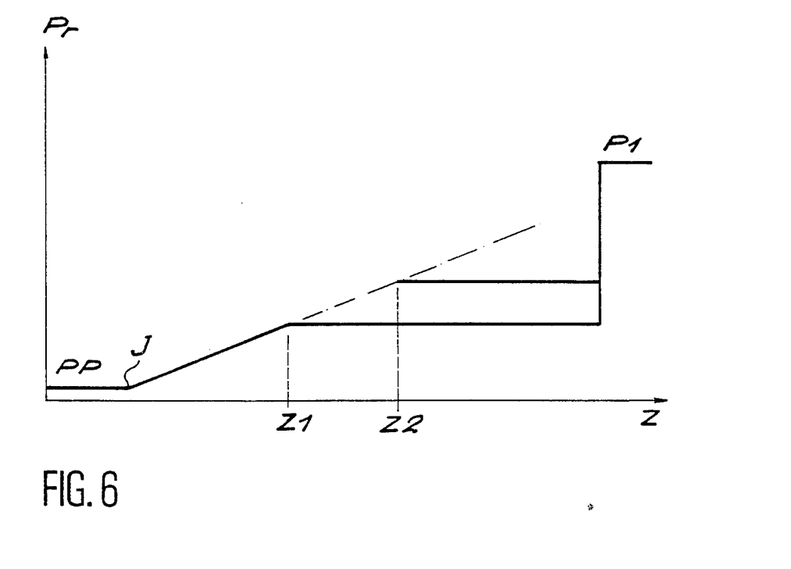
FIG. 6 Diagrammatically the pressure variations which can be obtained within the tube, as a result of the apparatus shown in FIG. 1, when the plasma column moves within the tube.

During the modulation of the microwave power, a width variation of the deposition area is observed. Thus, the increase in the volume of the discharge (plasma column) by a thermal effect creates an increase in the pressure in the tube. This leads to a decrease in the deposition area width during the displacement of the plasma column front. The evolution of the pressure Pr in the tube as a function of the length of said column is shown in FIG. 6, which assumes that the apparatus according to FIG. 1 is observed in such a way that the flow of gaseous mixture takes place from right to left (unlike in the case of FIGS. 1 and 2). The curve of the variations of Pr as a function of the position Z of the plasma column front has an area PP corresponding to the pressure downstream of valve 26, level with the pumping means 24 and then increases in a substantially linear manner from point J (which corresponds to valve 26) and then has a level zone and then a discontinuity at end 6 of tube 2, where the gaseous mixture is introduced with a pressure P1, which in the described example is substantially equal to atmospheric pressure (approximately $10^5$ Pa). The pressure increases when the plasma column front moves from end 6 of tube 2 from a position Z1 to a position Z2.

Over a microwave power modulation period, the pressure measured by the gauge 22 varies by a few hundred Pa, which induces deposition area width variations of approximately 1 to 2 cm and consequently a thickness inhomogeneity over the length and which is estimated as approximately 10%. In order to maintain the deposition width at a substantially constant value, it is possible to display the latter e.g. on a video monitor 90, and to appropriately act on the suction control valve 26 of pump 24 the in order to maintain the deposition area width at the desired constant value, it being necessary to increase the opening of the valve 26 when the deposition area width decreases and to decrease the same when said width increases.

In a purely indicative and non-limitative manner, an example of the use of the apparatus shown in FIG. 1 is given hereinafter.

In this example, the internal and external diameters of the substrate tube 2 are respectively 19 and 25 mm. By control, the furnace temperature is maintained at 1150° C. In a preliminary phase, the gaseous mixture is constituted by pure argon with a flow rate of 100 sccm (standard cubic centimeters per minute) and an argon plasma is formed for approximately 15 mm, which permits a very effective desorption of the inner walls of the tube. The composition of the gaseous mixture is then as follows: 800 sccm of oxygen, 200 sccm of $SiCl_4$ and 0 to 30 sccm of $GeCl_4$. The pressure upstream of valve 26 is kept constant at approximately 500 Pa by means of valve 26. The microwave power modulating frequency is 0.2 Hz, which corresponds to a deposition of two elementary films of the vitreous coating in 5 seconds. Thus, about 2400 elementary films are formed each having a thickness of 0.25 micrometer, which corresponds to a total deposition of 53 grams in 100 minutes.

The triangular reference signal stored in the memory associated with microprocessor 82 in the form of the position table, associated with the frequency imposed for the passage through said table, permits a controlled modulation or modification of the microwave power between 300 and 2500 W. The resulting displacement of the deposition area is between 20 and 70 cm with respect to the ultra-high frequency coupler 4, so that there is a 50 cm long deposit in the tube 2, whose total length is chosen as a consequence thereof. The precision on the deposition area position is approximately 0.3 mm.

The pressure drop is 50 Pa, i.e. 50% over the length of the deposit, which corresponds to a deposition area width variation of approximately 5% for a width of 6 cm, i.e. 0.3 cm.

When the vitreous coating deposition phase is ended, the tube is narrowed or constricted on a glass making lathe. The preform obtained has a diameter of 18 mm and a length of 50 cm, i.e. a kilometric capacity of 10 kilometers of fibers having an external diameter of 125 micrometers and a core diameter of 50 micrometers. Over a length greater than 75% of the total length of the fiber (10 kilometers), the variation on the core diameter is ±1 micrometer and ±3 micrometers on 90% of said 10 kilometers.

Figure 7:
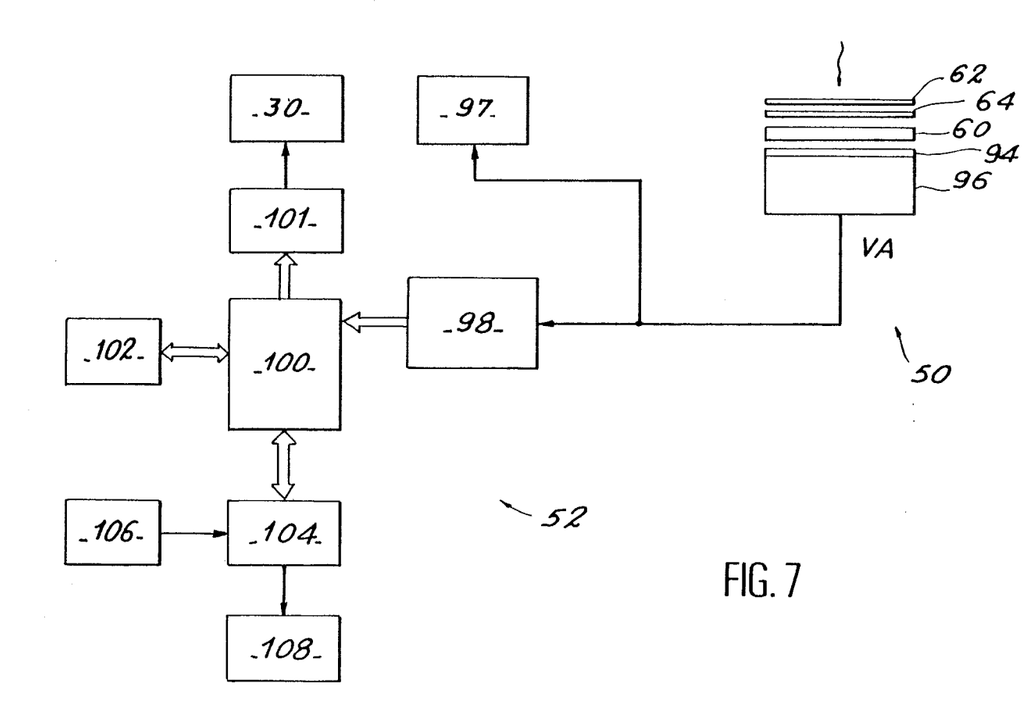
FIG. 7 A diagrammatic view of electronic control means used in another apparatus according to the invention.

FIG. 7 diagrammatically illustrates other electronic control means 52 used in another apparatus according to the invention. This other apparatus differs from that shown in FIG. 1 by the fact that the CCD array 56 is replaced by a photosensitive linear sensor having a single photosensitive element 94 associated with an electronic card 96. The element 94 has a length comparable to that of the CCD array, e.g. 30 mm, and in a purely indicate and non-limitative manner can be of the type marketed by the SITEK company under reference 1L30. Element 90 is obviously parallel to the slit 48 and associated with optics 60 and filters 62, 64.

By means of the card 96, the element 94 supplies an analog voltage VA proportional to the position of the deposition area. This analog voltage is supplied to the input of the display means 97 permitting a visual check of the position of the plasma column front.

This analog voltage VA is also supplied to the input of the analog-digital conversion means 98, where it is digitized and then supplied to the input of a microprocessor 100 (homolog of the microprocessor 82 of FIG. 3), which digitally processes a control voltage of the microwave generator 30. This digital voltage is converted into an analog voltage signal by a digital-analog converter 101, whose output controls the generator 30.

Microprocessor 100 is associated with storage means 102 (homologs of means 84) and a microcomputer 104 (homolog of microcomputer 86), is itself associated with input 106 and output 108 means (respectively homologs of means 88 and 90).

In a not shown variant of the apparatus described relative to FIG. 1, use is made of a mobile and not fixed optical sensor, as well as appropriate mechanical means for making the said sensor perform reciprocating movements at a constant speed along the furnace slit and action takes place on the microwave power so that the plasma column front constantly remains facing the mobile sensor. The latter can comprise two rigidly integral photodetectors aligned parallel with the slit, or a CCD array also parallel to said slit. Action takes place on the microwave power, so that the plasma column front is constantly between the two integral photodetectors, or between the two end detectors of the CCD array.

We claim:

1. Apparatus for the production of preforms for optical fibers comprising means for depositing on the inner surface of a glass tube (2) a vitreous coating serving for the subsequent formation of the core of the optical fibers, said means comprising:
    means (16, 24) for continuously passing from a first end (6) of the tube to the second end (8) of the tube, a mixture of ionizable gaseous compounds able to bring about the formation of the coating by reacting with one another,
    an ultra-high frequency coupler (4) located on the side of the second end (8) of the tube and provided for forming in said tube a plasma column (34) for activating the reaction, said ultra-high frequency coupler being able to inject a travelling surface wave into the plasma column, and
    a variable power microwave generator (30) for supplying the ultra-high frequency coupler (4) with an electromagnetic power and for continuously and progressively varying said power, in such a way that the end (38) of the plasma column (34) sweeps the tube, the vitreous coating deposit taking place at a given time in a deposition area (54) emitting a light characteristic of the reaction and which is located in the plasma column in the vicinity of the end thereof,
characterized in that the apparatus also comprises:
    photodetection means (50) sensitive to said light and able to supply information relative to the position of the deposition area, and electronic means (52) for controlling the displacement of the deposition area, said displacement being such that the thickness of the coating is uniform, control means being provided for controlling the power of the generator (30) as a function of information supplied by the photodetection means (50).

2. Apparatus according to claim 1, wherein the photodetection means (50) are fixed with respect to the ultra-high frequency coupler (4), observe the successive positions of the deposition area (54) when the end of the plasma column sweeps the tube and can supply electric signals taking account of these successive positions.

3. Apparatus according to claim 2, wherein the photodetection means (50) comprise a photosensitive linear sensor (56, 94) positioned parallel to the axis of tube (2) and provided with optical filtering means (62, 64) to only permit the passage of the light characteristic of the reaction.

4. Apparatus according to claim 3, wherein the apparatus also comprises a furnace (40) for raising the tube (2) to a temperature which is at least equal to approximately 1000° C., said furnace having a longitudinal slit (48) making it possible to observe the displacement of the deposition area from the outside of the furnace, said slit extending parallel to the tube axis, and the photosensitive linear sensor (56, 94) is provided with optics (60) and is outside the furnace, facing the slit and at an appropriate distance therefrom to locate the said successive positions.

5. Apparatus according to claim 4, wherein the photosensitive linear sensor (94) comprises a single photosensitive element of the position sensor type, where only a small area of said element is excited at once by the light characterizing the reaction.

6. Apparatus according to claim 3, wherein the photosensitive linear sensor (56) comprises a plurality of photosensitive elements, only one group of adjacent photosensitive elements being excited at once by the characteristic light.

7. Apparatus according to claim 6, wherein the photosensitive linear sensor is a charge coupled device (56) in the form of an array or strip.

8. Apparatus according to claim 6, wherein the electronic control means (52) comprise means (66) for filtering signals supplied by the photodetection means (50), determination means (68, 70, 72, 74, 76) for locating, on the basis of said filtered signals, a photosensitive end element for each successively excited group and processing means (82) able to impose on the microwave generator (30), on the basis of the thus located photosensitive end elements, a control voltage, whose time evolution brings about the displacement of the deposition area (54) leading to the uniform coating thickness.

9. Apparatus according to claim 8, wherein the determination means comprise means (68, 70, 72) for converting the light signal corresponding to the characteristic light into a rectangular electric pulse (SG), whose time width of the high level is proportional to the full width at half maximum of said light signal and counting means (74) for determining said end photosensitive element on the basis of the rectangular electric pulse (SG).

10. Apparatus according to claim 8, wherein the determination means (68, 70, 72, 74, 76) are also provided for supplying an information making it possible to determine the width of the deposition area (54) at a given time.

11. Apparatus according to claim 10, wherein the determination means comprise means (68, 70, 72) for converting the light signal corresponding to the characteristic light into a rectangular electric pulse (SG), whose time width of the high level is proportional to the full width at half maximum of said light signal, counting means (74) for determining said photosensitive end element on the basis of the rectangular electric pulse (SG) and other counting means (76) for determining the number of photosensitive elements of the excited group, on the basis of the time width of the high level of the rectangular pulse (SG).

12. Apparatus according to claim 1, wherein the control is a closed loop control, the information supplied by the photodetection means (50) being processed and compared on a permanent basis in electronic control means (52) with the position information initially stored in said electronic control means.

13. Apparatus according to claim 1, wherein the control is an open loop control, the information supplied by the photodetection means (50) being used, at least initially, by the electronic control means (52) for determining a series of appropriate control voltages of the microwave generator (30).

14. Apparatus according to claim 1, wherein the control is an open loop control, the information supplied by the photodetection means (50) being used by the electronic control means (52) for periodically refreshing a series of control voltages of the microwave generator (30) stored in the electronic control means (52).

15. Apparatus according to claim 1, wherein the electronic control means (52) permit a displacement of the deposition area (54) at constant speed.

* * * * *